Feb. 28, 1950     D. S. WEISS     2,498,776
TRAILER HITCH
Filed Oct. 17, 1947     2 Sheets-Sheet 1
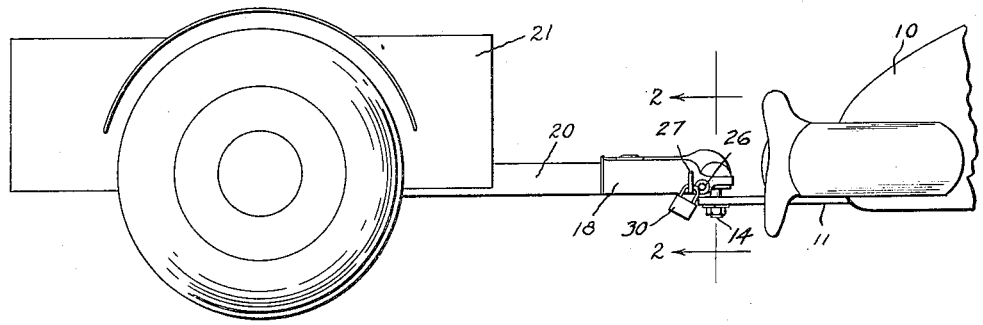
Fig. 1
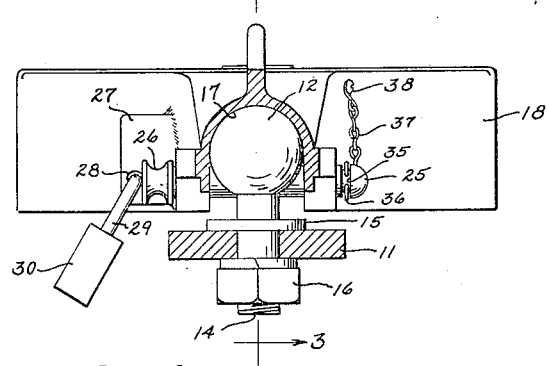
Fig. 2
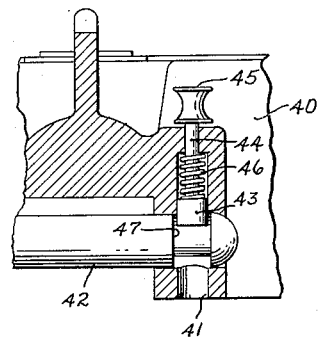
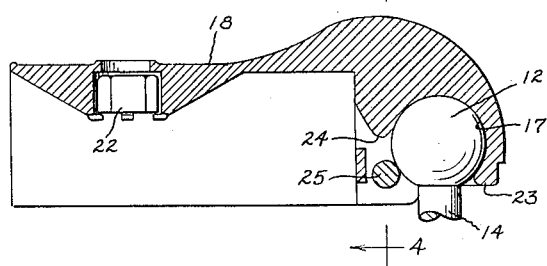
Fig. 3
INVENTOR.
Dewey S. Weiss
BY
Attorney Patented Feb. 28, 1950

2,498,776

UNITED STATES PATENT OFFICE 2,498,776

TRAILER HITCH

Dewey S. Weiss, Portland, Oreg.

Application October 17, 1947, Serial No. 780,338

8 Claims. (Cl. 280—33.17)

My present invention relates to means for coupling a leading vehicle to a trailing vehicle.

Coupling means of the type involved, which are generally known as trailer hitches, have long been known in various forms. The principal object of the present invention is to provide a trailer hitch of a well known standard type with means assuring the safety of occupants of a vehicle and of persons past whom a vehicle is being towed. In the absence of proper safeguarding means trailer hitches quite often become uncoupled with resulting damage to property and persons. The present invention has for its principal object the provision of means whereby accidental uncoupling of the separable elements of a trailer hitch is rendered virtually impossible.

A further object of the present invention is to provide a trailer hitch of a generally well known type with an improved ball and socket joint, the socket portion thereof comprising a single, rugged and inexpensively fabricated casting, in which the ball portion of the joint is locked by a retaining pin which is prevented from accidental displacement.

A further object of the present invention is to provide a coupling of the type herein disclosed in which limited universal movement is permitted between the trailing and leading vehicle without play between the two parts of the coupling. When a vehicle and trailer are traveling at high speed the coupling member is subjected to severe shocks and strains if there is play between the two portions thereof. The present invention eliminates play between the two portions whereby such excessive shocks and strains are eliminated.

A further object of the present invention is to provide a trailer hitch of the ball and socket type with means to retain the ball in the socket comprising a pin so shaped and arranged as to prevent withdrawal thereof in the absence of intelligent manipulation of the pin.

A further object of the present invention is to provide a ball and socket trailer hitch with a ball retaining pin which may be inserted or withdrawn in one position only and which is located in retaining position by a spring-urged latch, the pin and latch having cooperating means formed thereon for rotating the pin to a position with respect to the mounting for the pin such that it cannot be withdrawn until the latch is released.

The foregoing and other objects and advantages of the present invention will be more readily apparent from an inspection of the accompanying drawings taken in connection with the following specification wherein like numerals refer to like parts throughout, while the features of novelty will be more particularly pointed out in the appended claims.

In the drawing

Fig. 1 is a view in side elevation of a portion of a towing vehicle, and a towed vehicle attached thereto by one form of the present invention;

Fig. 2 is a vertical section on an enlarged scale taken substantially along the line 2—2 of Fig. 1;

Fig. 3 is a vertical section taken substantially along line 3—3 of Fig. 2;

Fig. 4 is a vertical section on an enlarged scale taken substantially along line 4—4 of Fig. 3 but showing a modified form of the pin latching means;

Figure 5:
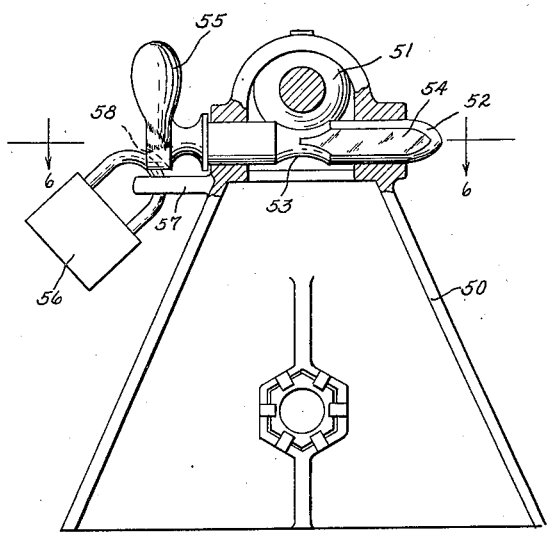
Fig. 5 is a bottom view of a socket member having a ball retained therein and a modified form of retaining pin, with portions broken away for illustration.

Referring to Figs. 1, 2 and 3 inclusive, a towing vehicle 10 is illustrated as having a rearwardly projecting bar 11 thereon which supports a ball 12 projecting upwardly therefrom on the end of a threaded stem 14 which is retained on the bar 11 by a collar 15 integral with the stem and a nut 16. The ball is receivable in a socket 17 formed in the forward end of a socket member 18 formed as a one piece casting and comprising triangular side walls adapted to embrace an A-frame 20 extending forwardly from the trailing vehicle 21, the socket member being retained on the A-frame by suitable means including a nut 22 non-rotatively retained in a socket in the member 18. The socket 17 is preferably hemispherical in shape with the axis of rotation thereof inclined rearwardly so that the forward lip 23 overhangs the rearward lip 24 by a considerable extent, preferably coming down to the level of the junction between the ball 12 and its stem 14. The ball may be separated from the socket by withdrawing it downwardly and slightly to the rear but when retained in the socket is snugly embraced throughout substantially half of its area. When positioned within the socket the ball may be locked in place by a retaining pin 25 passing through lugs at the front end of the member 18

The pin 25 is placed beneath the rear lip 24 in such position as to be tangent to the ball 12 midway between the lip 24 and the stem 14 when the stem is vertical. As seen in Fig. 2 the stem may cant from side to side to a considerable extent and as seen in Fig. 3 the stem may cant from front to rear or vice versa to a considerable extent. Allowance is therefore made for relative angular displacement of the towing and towed vehicle in all directions without permitting relative displacement of the ball and socket other than in a rotating sense. Shocks and strains due to traveling conditions are thus firmly passed from one vehicle to the other and neither portion of the coupling is subjected to impact due to sudden applications of force.

The retaining pin 25 disclosed in Figs. 1, 2 and 3 is preferably substantially cylindrical so as to pass through cylindrical openings in the member 18 and is preferably provided with a rounded entering end so that it may be easily inserted. The head 26 of the retaining pin may assume any shape provided it is large enough to be prevented from passing through the pin receiving openings. One side of the member 18 may be provided with a lug 27 adjacent the pin receiving opening, the lug being provided with an opening 28 adjacent the pin receiving opening and so spaced therefrom as to permit the passage of the bail 29 of a snap lock 30 when the head 26 is in position. As seen in Fig. 1 the elements are so related to each other that regardless of how the lock 30 is manipulated the bail 29 will prevent withdrawal of the retaining pin unless the lock 30 is unlocked and withdrawn entirely. The coupling is thus rendered safe against accidental separation during traveling and theft of the trailer prevented.

The retaining pin 25 may be provided with an annular groove 35 adjacent its entering tip in which a snap ring 36 may be received, the ring being mounted at the end of a chain 37 fastened to the member 18 by a screw 38. Thus in the event of loss of the lock 30 means are provided for retaining the pin against accidental displacement, the snap ring also providing a quick-latching device or an additional safeguard to supplement the lock 30.

In the modification disclosed in Fig. 4 a member 40 similar to member 18 is provided with a vertical bore 41 intersecting the bore for reception of the tip of a modified retaining pin 42. The bore 41 guides a plunger 43 having a reduced stem 44 and exposed head 45, there being a spring 46 imposed between the plunger and the top of the socket 41. The modified retaining pin 42 is provided with an annular groove 47 in position to receive the plunger 43 to prevent accidental displacement of the retaining pin.

In each form of the invention so far disclosed each of the retaining pins is tangentially disposed with respect to the surface of the ball. It is conceivable that excess usage of the coupling device will result in a groove being worn in the surface of the pin, thus permitting rattling of the coupling and possible breakage or separation of the coupling. In order to safeguard against this I prefer to provide a retaining pin of larger diameter, which is provided with a rounded, reduced central portion providing a larger area of contact between the surface of the pin and the surface of the ball. One form of such a pin is disclosed in Fig. 5 wherein it may be seen that a socket member 50 is adapted to receive a ball 51, the ball being retained by a retaining pin 52 having a rounded, reduced central portion 53. In order to permit insertion of the pin the portion thereof between the entering tip and the reduced portion is provided with a longitudinally extending flat face 54, which when positioned toward the surface of the ball permits longitudinal movement of the pin. When the flat face 54 is rotated to any other position, withdrawal of the pin is rendered impossible, and insertion or withdrawal of the pin can only be achieved by intelligently manipulating the pin until the flat face 54 is in proper alignment. In order to insure against accidental displacement of the pin due to vibrations or bouncing I prefer to provide the pin with a handle or offset weight 55 so oriented with respect to the flat surface 54 that the handle when naturally turned down by the force of gravity holds the flat face 54 at a considerable distance from its movement permitting position. If desired the handle may be supplemented by a lock 56, the bail of which passes through a lug 57 on the member 50 and a groove or other opening 58 provided in the retaining pin 52.

Figure 6:
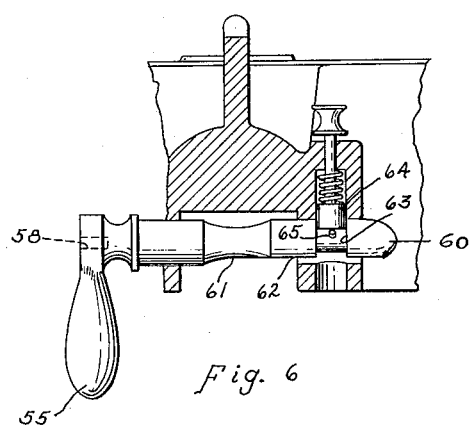
Fig. 6 is a vertical section taken substantially along line 6—6 of Fig. 5 and showing a modified form of retaining pin and latch.

In Fig. 6 a pin 60 such as disclosed in Fig. 5 and provided with a reduced central portion 61 and a flat face 62 is also provided with an annular groove 63 for the reception of a spring-loaded plunger 64. In order to assure rotation of the pin 60 to a position such that it may not be longitudinally moved a pin 65 projects outwardly from the reduced portion formed by the groove 63, the pin being of such length as to be engageable by the end surface of the plunger 64 and being so oriented with respect to the flat face 62 that the plunger 64 must be retracted before the flat face may be aligned with the surface of the ball.

Figure 7:
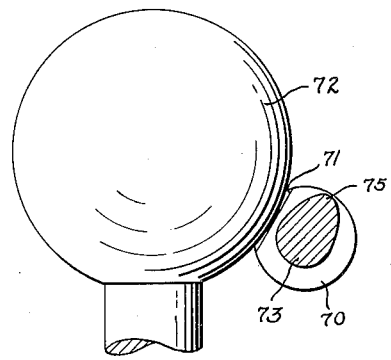
Fig. 7 is a partial sectional view on an enlarged scale showing a modified form of retaining pin in the position which it must assume to be inserted or withdrawn.
Figure 8:
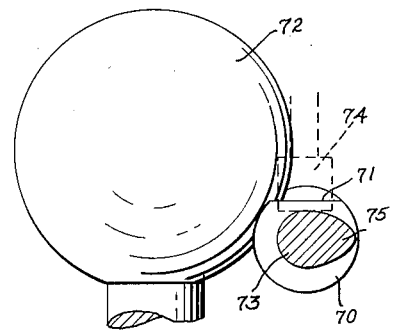
Fig. 8 is a view similar to Fig. 7 showing the retaining pin rotated to its latched position.

In lieu of a pin such as the pin 65 a retaining pin may be formed as shown in Figs. 7 and 8, the retaining pin 70 being provided with a flat face 71 which must be positioned tangentially to the surface of the ball 72 in order to permit longitudinal displacement of the retaining pin. This form of retaining pin is provided with a reduced portion 73 adapted to receive a latching plunger 74, the reduced portion being provided with a cam lug 75 projecting outwardly and so oriented with respect to the flat surface 71 that the pin is prevented from rotating in either direction to bring the flat surface tangentially to the ball.

While I have herein disclosed various modifications which portions of the invention may assume it will be readily apparent that all such modifications follow a general pattern. Various other modifications and arrangements which come within this same pattern will be readily apparent to those skilled in the art, and all such modifications as come within the true spirit and scope of the appended claims are considered to be a part of my invention.

I claim:

1. Means for coupling a leading vehicle to a trailing vehicle comprising a socket member adapted for mounting on one vehicle and having a substantially hemispherical socket therein, a ball adapted for mounting on the other vehicle and snugly receivable within said hemispherical socket, a retaining pin removably associated with said socket member and extending transversely of the opening of said hemispherical socket in such position as to be contiguous to the surface of the ball when positioned in the socket, said retaining pin being of larger diameter than may pass said ball, having a rounded, reduced central portion adapted to lie contiguously to the surface of said ball, and having a longitudinally extending surface of such effective diameter as to permit longitudinal movement of the pin past the ball when aligned therewith, and means to retain said retaining pin comprising a latching member and a spring urging said latching member into contact with said retaining pin, said retaining pin having a groove for reception of said latching member and a projection in said groove engageable by said latching member for rotating said retaining pin to remove said surface from the position relative to said ball which permits longitudinal movement of the retaining pin.

2. Means for coupling a leading vehicle to a trailing vehicle comprising a socket member adapted for mounting on one vehicle and having a substantially hemispherical socket therein, a ball adapted for mounting on the other vehicle and snugly receivable within said hemispherical socket, a retaining pin removably associated with said socket member and extending transversely of the opening of said hemispherical socket in such position as to be contiguous to the surface of the ball when positioned in the socket, said retaining pin being of larger diameter than may pass said ball, having a rounded, reduced central portion adapted to lie contiguously to the surface of said ball, and having a longitudinally extending surface of such effective diameter as to permit longitudinal movement of the pin past the ball when aligned therewith, and means to prevent accidental withdrawal of said retaining pin comprising a member holding said retaining pin against rotation to the position in which said surface is aligned with said ball.

3. Means for coupling a leading vehicle to a trailing vehicle comprising a socket member adapted for mounting on one vehicle and having a substantially hemispherical socket therein, a ball adapted for mounting on the other vehicle and snugly receivable within said hemispherical socket, a retaining pin removably associated with said socket member and extending transversely of the opening of said hemispherical socket in such position as to be contiguous to the surface of the ball when positioned in the socket, said retaining pin being of larger diameter than may pass said ball, having a rounded, reduced central portion adapted to lie contiguously to the surface of said ball, and having a longitudinally extending surface of such effective diameter as to permit longitudinal movement of the pin past the ball when aligned therewith, and means to prevent vibrations and jarring from rotating said retaining pin to the position in which said surface is aligned with said ball.

4. Means for coupling a leading vehicle to a trailing vehicle comprising a socket member adapted for mounting on one vehicle and having a substantially hemispherical socket therein, a ball adapted for mounting on the other vehicle and snugly receivable within said hemispherical socket, a retaining pin removably associated with said socket member and extending transversely of the opening of said hemispherical socket in such position as to be contiguous to the surface of the ball when positioned in the socket, said retaining pin being of larger diameter than may pass said ball, having a rounded, reduced central portion adapted to lie contiguously to the surface of said ball, and having a longitudinally extending surface of such effective diameter as to permit longitudinal movement of the pin past the ball when aligned therewith, and means to prevent vibrations and jarring from rotating said retaining pin to the position in which said surface is aligned with said ball comprising an eccentric weight on said retaining pin.

5. Means for coupling a leading vehicle to a trailing vehicle comprising a socket member adapted for mounting on one vehicle and having a substantially hemispherical socket therein, a ball adapted for mounting on the other vehicle and snugly receivable within said hemispherical socket, a retaining pin removably associated with said socket member and extending transversely of the opening of said hemispherical socket in such position as to be contiguous to the surface of the ball when positioned in the socket, said retaining pin being of larger diameter than may pass said ball, having a rounded, reduced central portion adapted to lie contiguously to the surface of said ball, and having a longitudinally extending surface of such effective diameter as to permit longitudinal movement of the pin past the ball when aligned therewith, and means to prevent vibrations and jarring from rotating said retaining pin to the position in which said surface is aligned with said ball comprising a separate member secured to said socket member and engageable with an end portion of said retaining pin, said end portion being so shaped as to prevent said retaining pin from being completely rotated when engaged by said separate member.

6. Means for coupling a leading vehicle to a trailing vehicle comprising a socket member adapted for mounting on one vehicle and having a substantially hemispherical socket therein, a ball adapted for mounting on the other vehicle and snugly receivable within said hemispherical socket, a retaining pin removably associated with said socket member and extending transversely of the opening of said hemispherical socket in such position as to be contiguous to the surface of the ball when positioned in the socket, said retaining pin being of larger diameter than may pass said ball, having a rounded, reduced central portion adapted to lie contiguously to the surface of said ball, and having a longitudinally extending surface of such effective diameter as to permit longitudinal movement of the pin past the ball when aligned therewith, and means to prevent vibrations and jarring from rotating said retaining pin to the position in which said surface is aligned with said ball comprising an annular groove in the end of said retaining pin and having a cam projection therein, and a spring-urged plunger mounted in said socket member and receivable in said groove to engage said cam projection.

7. In a ball and socket coupling adapted to couple a leading vehicle to a trailing vehicle including a ball arranged on the end of a substantially vertically extending supporting stem adapted to be mounted upon one of said vehicles, the invention comprising a socket unit adapted to be mounted upon the other of said vehicles, said unit including a body member having a substantially hemispherical socket therein including a forward wall portion facing rearwardly toward said vehicle, said socket being adapted for cooperatively and snugly receiving said ball, a pair of aligned openings in the opposite side walls of said socket unit, an elongated pin of substantially cylindrical configuration longitudinally slidable through said pair of openings to a limit position for retaining said ball within said socket, said pin having an annular groove in the mid-portion thereof, the bottom wall of said groove being curved in the longitudinal direction of said pin, the radius of curvature of said bottom wall being substantially the same as that of said ball, said ball seating within said groove when said retaining pin is in place, a head on one end of said pin, the end portion of said pin opposite said head being cut away along one side thereof from said groove to said opposite end to a depth equal to the bottom of said groove whereby said pin may be longitudinally withdrawn from said openings when said cut-away side of said pin end portion faces said ball.

8. In a ball and socket coupling for coupling a leading vehicle to a trailing vehicle including a socket member adapted to be mounted on one of said vehicles and having a socket therein, and a ball arranged on the end of a stem adapted to be mounted on the other of said vehicles, said ball being snugly receivable in said socket; the invention comprising a socket member having a hemispherical socket therein adapted snugly to receive said ball, said socket having an open mouth through which said ball may be inserted and withdrawn, a retaining pin mounted in said socket member, said retaining pin extending transversely of the open mouth of said socket in contact with the exposed surface of said ball opposite the surface portion of said ball engaging said socket so as to prevent jarring of the ball in the socket during movement of the vehicles, said retaining pin spanning said mouth in normally spaced relation to said stem so as to allow angular shifting of said stem as the vehicles shift relative to one another during movement, said pin having an annular groove in the midportion thereof with the bottom wall of said groove being curved in the longitudinal direction of said pin, the radius of curvature of said bottom wall being substantially the same as that of said ball, and said ball being seated in said groove.

DEWEY S. WEISS.

REFERENCES CITED

The following references are of record in the file of this patent:

UNITED STATES PATENTS

| Number | Name | Date |
|---|---|---|
| 2,204,116 | Blocker | June 11, 1940 |
| 2,234,163 | Gurney et al. | Mar. 11, 1941 |

FOREIGN PATENTS

| Number | Country | Date |
|---|---|---|
| 374,065 | Great Britain | May 24, 1932 |